United States Patent
Barbella et al.

Patent Number: 5,808,578
Date of Patent: Sep. 15, 1998

[54] GUIDED MISSILE CALIBRATION METHOD

[76] Inventors: Peter F. Barbella, 62 Goldsmith St., Littleton, Mass. 01460; Malcolm F. Crawford, 19 Ellison Rd., Lexington, Mass. 02173; William M. Kaupinis, 95 Riverdale St., Methuen, Mass. 01844; Jeffrey E. Carmella, 12-1 Wampus Ave., Acton, Mass. 01720; Michael A. Davis, 38 Willow Creek Dr., Hudson, N.H. 03051

[21] Appl. No.: 771,787

[22] Filed: Dec. 20, 1996

[51] Int. Cl.⁶ ........................................ G01S 7/40
[52] U.S. Cl. .................. 342/62; 342/77; 342/80; 342/97; 342/141; 342/149; 342/165; 342/174; 244/3.19
[58] Field of Search .................... 342/62, 77, 80, 342/141, 149, 174, 95, 97, 165, 166, 169, 170, 171; 244/3.15, 3.19

[56] References Cited

U.S. PATENT DOCUMENTS

| | | | |
|---|---|---|---|
| 4,224,507 | 9/1980 | Gendreu ............................. | 342/80 X |
| 4,713,666 | 12/1987 | Poux .................................. | 342/152 |
| 5,014,064 | 5/1991 | Spencer et al. ..................... | 342/152 |
| 5,051,752 | 9/1991 | Woolley ............................. | 342/151 |
| 5,315,304 | 5/1994 | Ghaleb et al. ..................... | 342/165 |
| 5,474,255 | 12/1995 | Levita ................................ | 244/3.14 |
| 5,606,324 | 2/1997 | Justice et al. ..................... | 342/62 |

*Primary Examiner*—John B. Sotomayor
*Attorney, Agent, or Firm*—Andrew J. Rudd; Glenn H. Lenzen, Jr.

[57] ABSTRACT

A method for calibrating the radar system includes the steps of: replacing stored statistically generated "average" error correction coefficients with error correction coefficients personal to a missile under test. More particularly, stored in the missile's memory are: (a) first personalized error correction coefficients generated in response to test signals produced internal to the missile and injected into a monopulse arithmetic unit for the missile's receiver/processor; and (b) a second set of personalized error coefficients generated in response to test signals external to the missile and injected through the missile's antenna to the receiver/processor. The missile includes a radio frequency (R.F.) energy test signal generator for performing a test during the missile's flight to determine "in-flight" personalized error correction coefficients. The test is performed in-flight by injecting the R.F. energy test signal generated internal to the missile during the missile's flight into the monopulse arithmetic unit for the receiver/processor. The receiver/processor: (a) compares the first set of error correction coefficients with the "in-flight" error coefficients and adjusts the second set of error correction coefficients in accordance with such comparison; and, (b) if R.F. energy external to the missile is less than a predetermined threshold level, uses the adjusted second set of coefficients during the missile's flight to produce boresight error signals; otherwise, the receiver/processor uses unadjusted first set of error correction coefficients.

12 Claims, 5 Drawing Sheets

GUIDED MISSILE CALIBRATION METHOD

BACKGROUND OF THE INVENTION

This invention relates generally to guided missiles and more particularly to methods for calibrating such missiles to correct for hardware generated errors which, if uncorrected, would adversely effect the missile's performance.

As is known in the art, a missile may be guided towards a target by guidance signals developed by a sensor carried by the missile. One such sensor is a radar system. In such case, radar signals received from the target are processed to develop control signals to both maintain track of the target and aerodynamically direct the missile to intercept the target. For example, one such radar system may include a monopulse radar receiver. In such system, a monopulse antenna receives radar energy from the target in each of four antenna quadrants. The energy received in these four quadrants is fed to a monopulse arithmetic unit where they are combined into a sum signal, an azimuth difference signal and an elevation difference signal. A receiver/processor processes the sum and pair of difference signals in corresponding sum and pair of difference channels within the receiver/signal processor to produce boresight errors (BSE) signals, i.e., the control signals used to both maintain track of the target and aerodynamically direct the missile to intercept the target. (The BSE is defined as the angle between the antenna centerline 15 (i.e., an axis normal to the antenna and passing through a point common to all four quadrants) and a line 17 draw from such point to the target T, i.e., the target line of sight).

As is also known in the art, relative phase and gain differences between the sum and each of the pair of difference channels in the receiver/processor resulting from hardware imbalances therebetween may have significant adverse effect on the performance of the receiver/processor. Techniques to account for, and thereby correct for, these gain and phase imbalances in the monopulse receiver/processor channels are described in U.S. Pat. No. 3,794,998, issued Feb. 26, 1974, inventors Pearson et al., and U.S. Pat. No. 3,950,750, issued Apr. 13, 1976, inventors Churchill et al. al., both assigned to the same assignee as the present invention.

As described in these U.S. patents, test signals are applied to the receiver/processor. Signals produced by the receiver/processor in response to the test signal are measured and compared with a priori determined standard signal, (i.e., signals which would have been produced in an "ideal" receiver having error-free hardware). Error correction coefficients are generated from the comparison. The generated error correction coefficients are stored in a memory in the missile. During normal operation, the receiver/processor signals produced from target returns are corrected by the stored error correction coefficients to thereby provide "ideal" receiver produced signals free of hardware errors.

Another source of error results from the missile's antenna having a boresight error slope (BSE) characteristic which deviates from a nominal BSE slope upon which the missile's guidance equation is predicated. Here, a test is made at the factory to determine the boresight error slope of the missile and adjustment, either by hardware (i.e., potentiometer) or software, is made to account for any deviations between the actual boresight error slope and the predicated nominal boresight error slope.

As is also known in the art, current missile technology has evolved to the point where digital computers, under sophisticated software control, are used to extract maximum system performance. Thus, after a missile is produced, a software package is stored in a memory within the missile. The software is to be used in processing received target radar signals for tracking and guiding the missile to the target, i.e., so-called tactical software. In such system, based on acceptable hardware tolerances, statistically generated "average" error correction coefficients are a priori calculated and stored in as an error correction coefficient file in the software package. These error correction coefficients represent error correction coefficients statistically averaged over a large number of missiles. Thus, the software package loaded into the missile includes in one block, or file of the missile's memory tactical software, and in another block of missile's memory the statistically generated "average" correction coefficients.

As is also known in the art, once these statistically generated "average" error correction coefficients are loaded into the missile's memory along with the tactical software, the missile is operational. Once mounted on its launcher, awaiting launch and even during flight, test signals are injected into one of the quadrants fed to the missile's monopulse arithmetic unit to generate updated error correction coefficients. Further, while on its launcher, or during flight, external radio frequency energy is monitored by the radar receiver because certain electromagnetic interference (EMI) conditions can dominate the effect of the internally generated test signal thereby resulting in incorrectly computed error correction coefficients. Therefore, to avoid such situation, if the EMI interference exceeds a predetermined threshold level, the missile uses the stored, statistically averaged error correction coefficients. If, on the other hand, the EMI is less than, or equal to, the threshold the missile uses the error correction coefficients generated from the internally generated test signal. These internally generated error correction coefficients, while correcting for gain and phase imbalances among the sum and difference channels of the receiver, do not correct for antenna boresight error slope errors.

As is also known in the art, it is frequently required that the software stored in the missile's memory be non-readable by anything external to the missile. That is, it is frequently required that the software in the missile's memory be "protected". In some case, however, it may be desired to externally read certain software files stored in the missile's memory. For example, the software loaded into the missile may include the missile's identification, or serial, number. Therefore, if it is desired to load new software into a particular missile at a maintenance depot, for example, it may be necessary to have a control computer at the depot read the serial number of the missile being maintained or upgraded. Thus, while certain files, or missile memory locations, are "protected" (i.e., non-externally readable) by the control computer (and any attempt to read such files would erase the software), other files, or missile memory location, are "non-protected" (i.e., externally readable) by the control computer.

SUMMARY OF THE INVENTION

In accordance with one feature of the invention, a guided missile is provided having a radar system adapted to generate control signals in response to target radar return signals. The radar system includes a monopulse antenna adapted to receive radar signals from the target, a monopulse arithmetic unit coupled to the monopulse antenna for producing a sum signal, an elevation difference signal, and an azimuth difference signal from energy received by the antenna from the target, and a monopulse receiver/processor for producing boresight error signals in accordance with the monopulse arithmetic unit produced signals and error correction coefficients stored in a memory disposed within the missile. The memory has stored therein: (a) first personalized error correction coefficients (i.e., internal/factory personalized error correction coefficients) generated at the factory or maintenance depot in response to test signals produced internal to the missile and injected into the monopulse arithmetic unit for the receiver/processor; and (b) a second set of personalized error coefficients (i.e., "through-the-antenna" personalized error correction coefficient) generated in response to test signals external to the missile and injected through the missile's antenna to the receiver/processor. The missile includes a radio frequency (R.F.) energy test signal generator for performing a test during the missile's flight to determine internal/"in-flight" personalized error correction coefficients. The test is performed by injecting the R.F. energy test signal generated internal to the missile during the missile's flight into the monopulse arithmetic unit for the receiver/processor. The receiver/processor: (a) compares the first set (i.e., internal/factory) of error correction coefficients with the internal/"in-flight" error coefficients and adjusts the "through-the-antenna" set of error correction coefficients in accordance with such comparison; and, (b) if R.F. energy external to the missile is less than a predetermined threshold level, uses the adjusted "through-the-antenna" coefficients during the missile's flight to produce boresight error signals; otherwise, the receiver/processor uses unadjusted "through-the-antenna" error correction coefficients.

With such method, corrections are made to account for receiver/processor channel gain and phase imbalances resulting from differences between the internal/factory personalized error correction coefficients generated at the factory ambient temperature and the temperature of the missile during its flight. Also, with such an arrangement, correction may be made to the antenna boresight error slope.

In accordance with another feature of the invention, a method is provided for calibrating the radar system at a missile factory. The method includes the steps of: loading software into the memory, such software including tactical software and statistically generated "average" error correction coefficients; transmitting a radar test signal through the antenna to the receiver/processor to produce "through-the-antenna" personalized error correction coefficients; re-formatting the software previously loaded into the memory to include the calculated "through-the-antenna" personalized error correction coefficients software; and loading the re-formatted software into the memory.

In accordance with another feature of the invention, a method is provided for calibrating the radar system at a missile factory or maintenance facility. The method includes the steps of: transmitting a radar test signal through the monopulse arithmetic unit internal to the missile to the receiver/processor to produce internal/factory personalized error correction coefficients; writing over previously stored internal/factory personalized error correction coefficients with the produced internal/factory personalized error correction coefficients.

With such method, aged missiles may be re-calibrated.

In accordance with another feature of the invention, a method is provided for up-grading tactical software in a missile, such missile having stored in a memory therein prior to up-grading previous tactical software stored in a protected, non-externally readable file thereof, and stored in a non-protected, externally readable file thereof personalized error correction coefficients. The method includes the steps of: reading external of the missile the personalized error correction coefficients stored in the memory; re-formatting up-graded tactical software with the externally read personalized error correction coefficients; and storing the re-formatted software in the memory.

BRIEF DESCRIPTION OF THE DRAWING

Other features of the invention, as well as the invention itself, will become more readily apparent when read together with the following detailed description, taken together with the accompanying drawings, in which.

DESCRIPTION OF THE PREFERRED EMBODIMENTS

Figure 1:
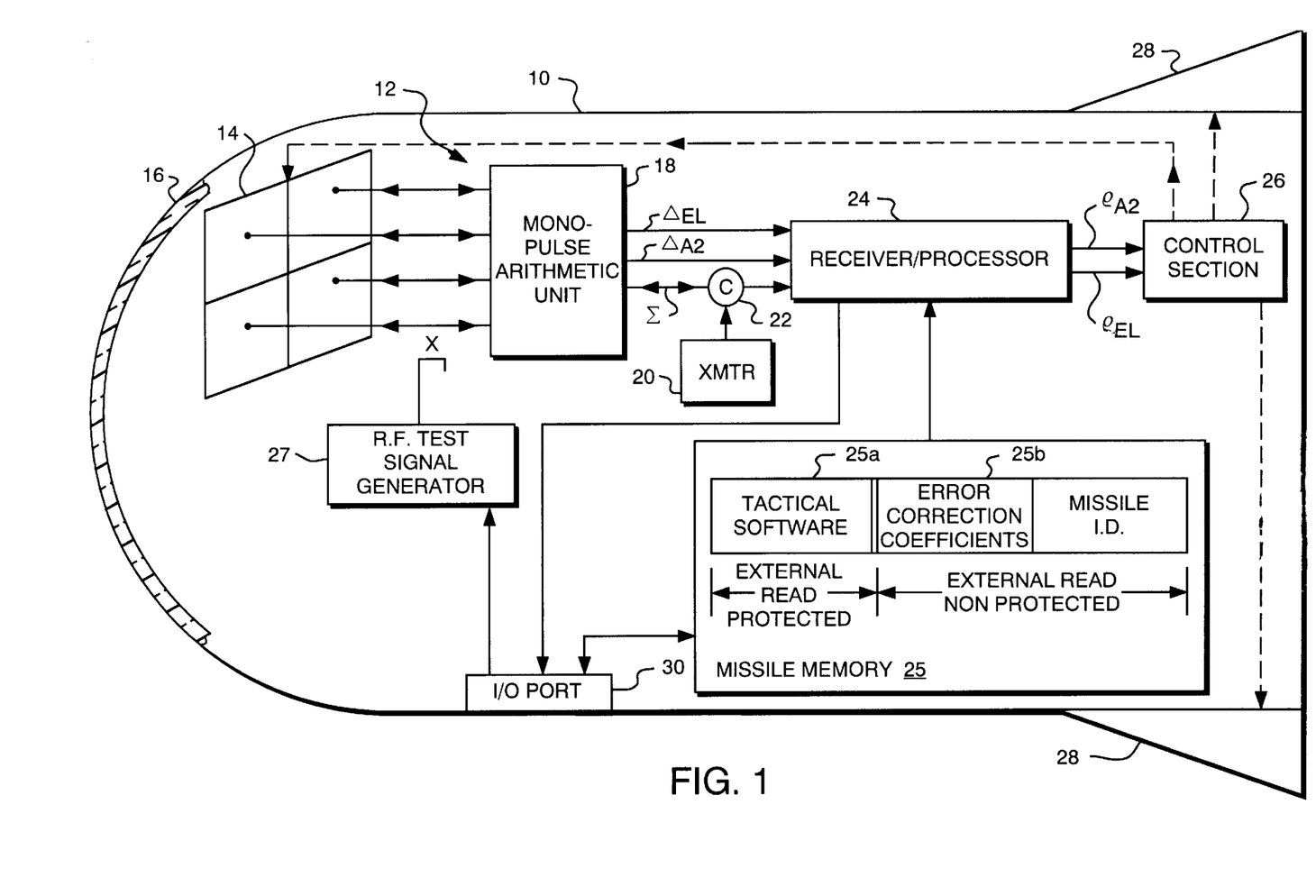
FIG. 1 is a diagrammatical sketch of a radar guided missile according to the invention, such sketch showing in block diagram a radar system according to the invention carried with the missile.

Referring now to FIG. 1, a guided missile 10 is shown having disposed therein a radar system 12 adapted to generate control signals to guide such missile 10 in response to target, T, radar return signals. The radar system 12 includes a monopulse antenna 14, disposed behind a radome 16 and adapted to receive radar signals from the target, T. A monopulse arithmetic unit 18, coupled to each of four quadrants of the monopulse antenna 14, is included within the missile 10 to produce, in a conventional manner, a sum signal, $\Sigma$, an elevation difference signal, $\Delta_{EL}$, and an azimuth difference signal, $\Delta_{AZ}$, from energy received by the antenna 14 from the target, T. A radar transmitter (XMTR) 20 is coupled to the antenna 14 via a circulator 22 and the sum channel, $\Sigma$, as shown.

A monopulse receiver/processor 24 is fed by the signals produced by the monopulse arithmetic unit 18 to produce an azimuth boresight error signal, $e_{AZ}$, and elevation boresight error signal, $e_{EL}$, (sometimes referred to as pitch and yaw boresight error signals) in accordance with the monopulse arithmetic unit 18 produced signals and error correction coefficients stored in a memory 25 disposed within the missile 12. The azimuth and elevation boresight error signal, $e_{AZ}$, $e_{EL}$, are fed to a control section 26 which produces control signals for fins 28 and an antenna gimbals system, not shown, to thereby enable the radar system 12 to both maintain track of the target, T, and aerodynamically direct the missile 10 to intercept the target, T.

More particularly, the memory 25 has stored therein tactical software, error correction coefficients and a missile serial, or identification (I.D.) number. The tactical software is stored in a protected, non-externally readable section 25a of the memory 25 and the error coefficients and missile I.D. number are stored in a non-protected, externally readable section 25b of the memory 25.

During missile production, a set of statistically "averaged" error correction coefficients are stored in section 25b of memory 25. These error correction coefficients are selected over a large number of missiles to correct for gain and phase imbalances between sum and difference channels in the receiver/processor, as for example in the AMRAAM missile system. Here, however, instead of shipping the missile 10 with these statistically "averaged" error correction coefficients as an operational missile, after loading the tactical software into the protected area of the missile memory and the statistically "averaged" error correction coefficients and missile I.D. number into the non-protected area of missile memory, tests are performed on the missile at the factory to generate error correction coefficients personalized to the missile under factory test, i.e., personalized error correction coefficients.

Figure 2:
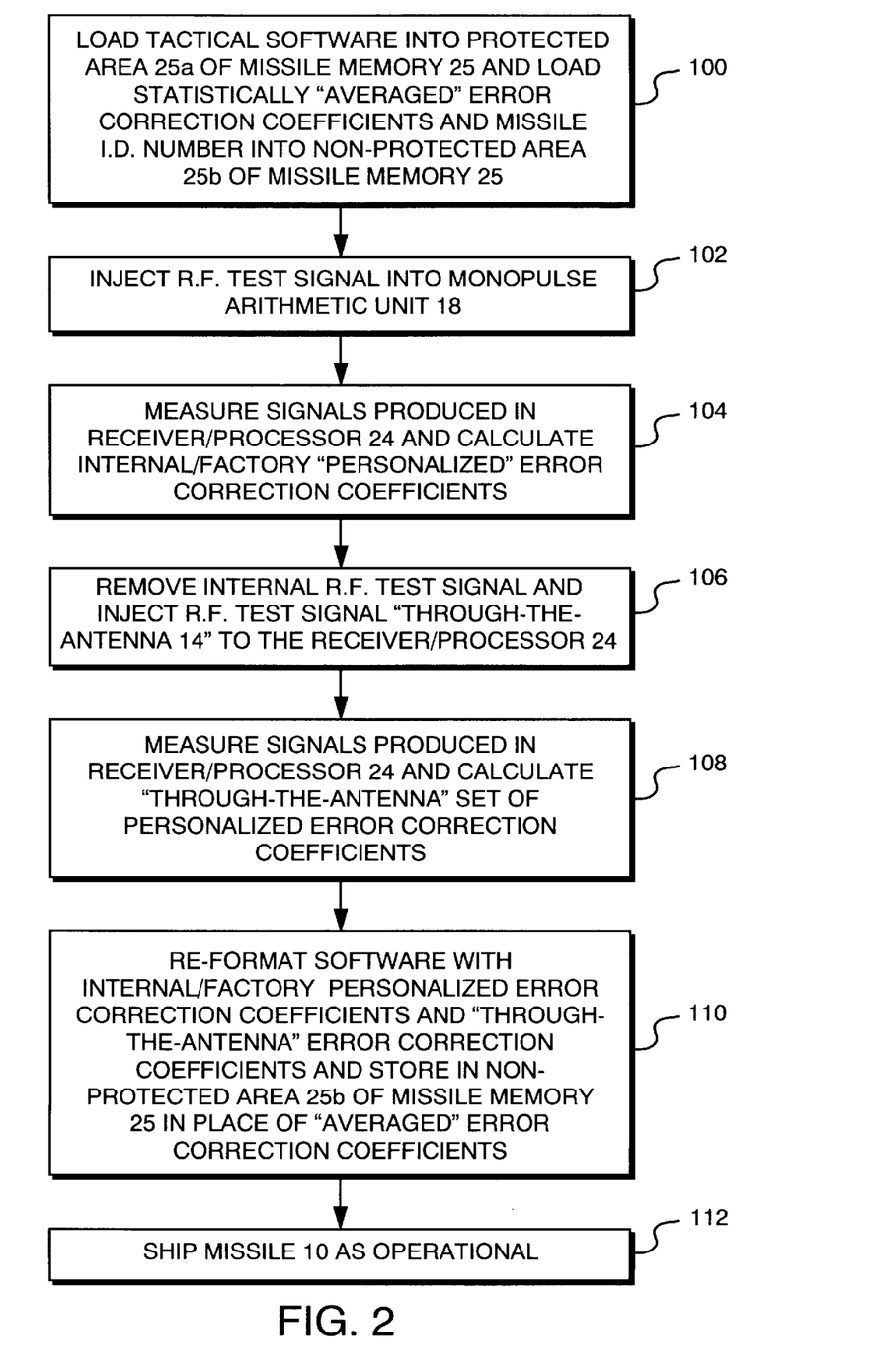
FIG. 2 is a flow diagram of a method used at a missile factory for testing the missile of FIG. 1.

More particularly, and referring to FIG. 2, at the factory, two sets of personalized error correction coefficients are generated and stored in the non-protected area of the missile memory: "through-the-antenna" personalized error correction coefficients; and, internal/factory personalized error correction coefficients. It should first be noted that the order in which these two sets of error correction coefficients is generated is arbitrary. It is next noted that while the first "through-the-antenna" error coefficients are generated by test at the factory, the internal/factory error coefficients may be generated at a factory or at a maintenance depot.

Thus, considering again test performed at the factory, and assuming here that the internal/factory personalized error correction coefficients are generated, the tactical and statistically "averaged" error correction coefficients are loaded into the memory 25 (Step 100), Next, a control signal is fed via an input/output (I/O) port 30 (FIG. 1) of the missile 10, to activate an R.F. test signal generator 27 disposed within the missile 10 (Step 102). In response to such activation signal, the R/.F. test signal generator injects an R.F. energy signal into one of the four inputs to the monopulse arithmetic unit via a directional coupler 29, as indicated, in a manner currently used to factory test the missile 10. In response to this injected test signal, signals produced by the receiver/processor 24 are fed, via the I/O port 30, to factory automatic systems test (FAST) equipment, not shown, to determine amplitude and phase imbalances between the sum and difference channels of the receiver/processor 24 in a conventional manner (Step 104). Here, however, rather than merely rejecting the missile in the event that the imbalances are excessive, internal/factory personal error correction coefficients are calculated and stored by the FAST equipment (Step 104).

Next, in order to correct for any errors in the missile's radome and/or antenna boresight error slope, he R.F. Signal generator 27 is deactivated and a source of R.F. energy, not shown, is placed in the close "far field" of the antenna 14 (Step 106). Such "far field" test is typically performed in a factory anechoic chamber, not shown. Here again, in response to this external to the missile R.F. test signal, signals produced by the receiver/processor 24 are fed, via the I/O port 30, to factory automatic systems test (FAST) equipment, not shown, to determine amplitude and phase imbalances between the sum and difference channels of the receiver/processor 24 and also the particular missile's antenna boresight error slope (Step 108). From these receiver/processor signals, "through-the-antenna" personalized error correction coefficients are calculated and stored by the FAST equipment. The antenna boresight error slope coefficient is merely a factor equal to the ratio of actual measured antenna boresight error slope to the boresight error slope assumed by the missile's guidance system. The calculated factor is thus applied to the guidance equation. Thus, if the actual, measured antenna boresight error slope is 80 percent of that assumed by the guidance equation, a factor of 1.25 is applied by the guidance equation in generating the control signal for the missile's control section.

Having performed the two tests described above, the FAST re-formats the software in the non-protected area of the missile memory with the personalized internal/factory error correction coefficients and the "through-the-antenna-error correction coefficients and stores them in the non-protected are of the missile memory in place of (i.e., by writing over) the statistically "averaged" error correction coefficients. (Step 110). The missile is then shipped as operational. (Step 112).

Figure 3:
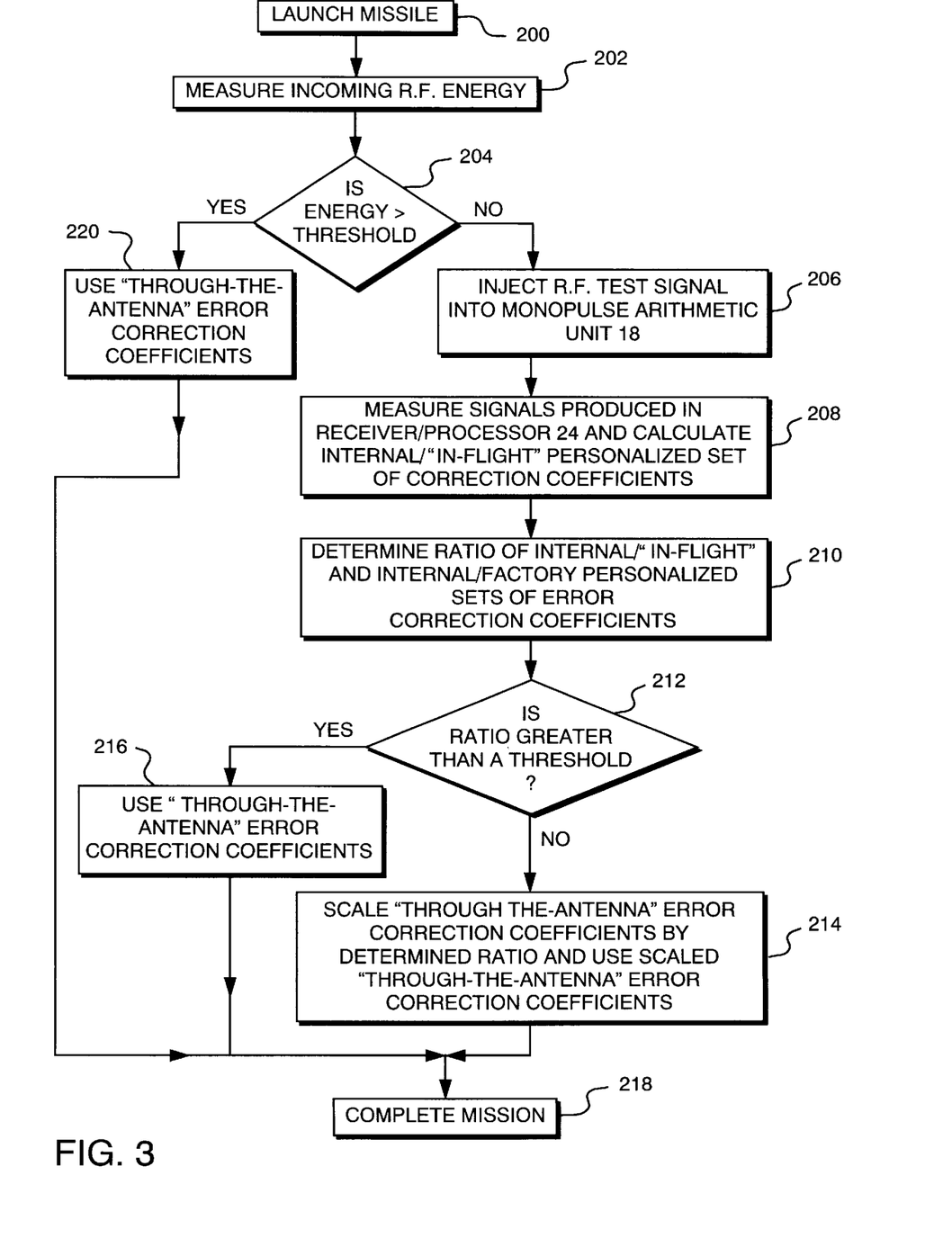
FIG. 3 is a block diagram of a method used to perform in-flight testing and operation of the missile of FIG. 1.

Referring to FIG. 3, once operational, and mounted to its launcher, and then launched (Step 200), during the missile's flight (i.e., in-flight) the R.F. test signal source 27 (FIG. 1) is activated by the receiver/processor 24 to enable internal "in-flight" error correction coefficients to be calculated in the same manner as performed in the factory. (Step 206). This is desirable to account for receiver/processor channel gain and phase imbalances resulting from differences between the internal/factory personalized error correction coefficients generated at the factory ambient temperature and the temperature of the missile during its flight. However, in order to prevent high levels of R.F. energy external to the missile and received by the antenna 14 from corrupting the internal test, the receiver/processor 24 measures the amount, i.e., level, of incoming R.F. energy (Step 202). If (Step 204) the level of the energy is greater than a predetermined threshold level the receiver/processor uses the stored "through-the-antenna" error correction coefficients (Step 220). However, if (Step 204) the level of the energy is less than, or equal to, the predetermined threshold level, the internal R.F. test signal is injected into the monopulse arithmetic unit as in the factory (Step 206). The receiver/processor 24 measures signals produced therein in response to injected test signal and calculates "in-flight" personalized error correction coefficients. (Step 208). The receiver/processor 24 then determines the ratio of the stored, internal/factory personalized error correction coefficients to the calculated "in-flight" error correction coefficients. (Step 210). If the ratio is less than a predetermined threshold level, (Step 212) the "through-the-antenna" error correction coefficients are scaled by the calculated ratio and the scaled "through-the-antenna" error correction coefficients are used by the missile during its flight (Step 214). If, on the other hand, the ratio is greater than, or equal to, the predetermined threshold, the receiver/processor uses the "through-the-antenna" error correction coefficients, unscaled, during its flight to the target (Step 218). In all cases the mission is completed (Step 218).

Figure 4:
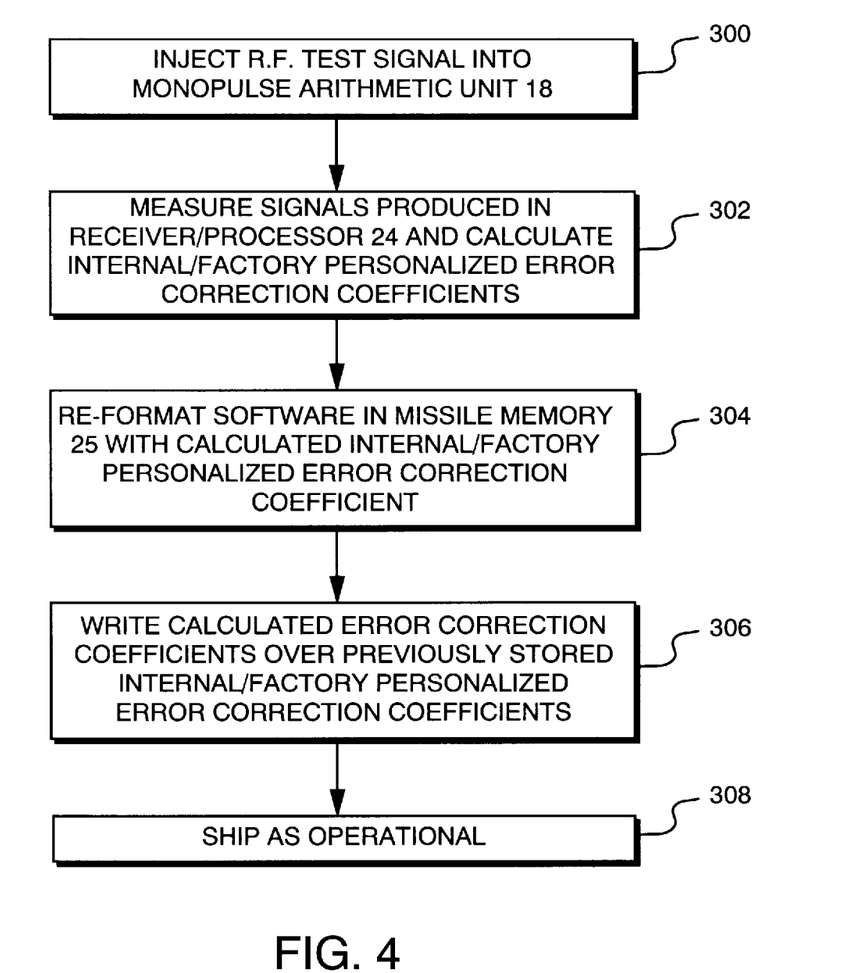
FIG. 4 is a block diagram of a method for re-calibrating a missile of FIG. 1 at a maintenance depot.

Referring now to FIG. 4, in order to upgraded and/or maintain aged missile, the missile is sent to a maintenance depot. At the depot, the internal R.F. test signal generator is activated. The test signal is thereby injected through the monopulse arithmetic unit 18 (Step 300) internal to the missile 10 to the receiver/processor 24 to produce a new set of internal/factory personalized error correction coefficients. (Step 302). The set may change from the personalized set stored in the missile memory being of receiver/processor component aging. The new set of internal/factory personalized error correction coefficients are written over the old set of stored internal/factory personalized error correction coefficients (Steps 304, 306). The missile is now shipped as operational. (Step 308).

Figure 5:
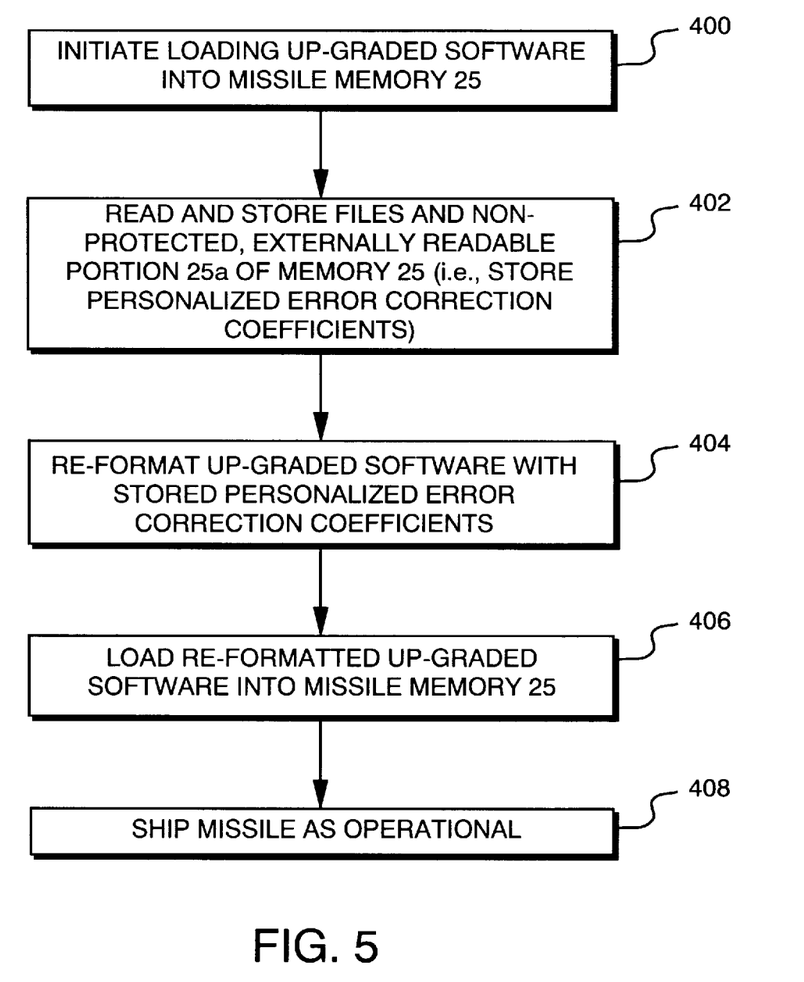
FIG. 5 is a method of upgrading software stored in a memory of the missile of FIG. 1.

Referring now to FIG. 5, to install upgraded tactical software at the depot, new software is initially loaded into the memory 25 (Step 400). The personalized error correction coefficients previously stored in the missile memory 25b, are read, and stored by a control computer at the depot. (Step 402). The control computer re-formats the up-graded software with the externally read personalized error correction coefficients. (Step 404). The re-formatted software is written into the missile memory. (Step 406). The missile is then shipped as operational. (step 408).

Other embodiments are within the spirit and scope of the appended claims.

What is claimed is:

1. A guided missile, comprising:

a radar system adapted to generate control signals to guide a missile in response to target radar return signals, such radar system having:

a monopulse antenna adapted to receive radar signals from the target;

a monopulse arithmetic unit coupled to the monopulse antenna for producing a sum signal, an elevation difference signal, and an azimuth difference signal from energy received by the antenna from the target; and a monopulse receiver/processor for producing boresight error signals in accordance with the monopulse arithmetic unit produced signals and error correction coefficients stored in a memory disposed within the missile, the memory having stored therein: (a) first personalized error correction coefficients generated in response to test signals produced internal to the missile and injected into the monopulse arithmetic unit for the receiver/processor; and (b) a second set of personalized error coefficients generated in response to test signals external to the missile and injected through the missile's antenna to the receiver/processor.

2. The missile recited in claim 1 including a radio frequency (R.F.) energy test signal generator for performing a test during the missile's flight to determine "in-flight" personalized error correction coefficients.

3. The missile recited in claim 2 wherein the missile includes means for injecting the R.F. energy test signal during the missile's flight into the monopulse arithmetic unit for the receiver/processor.

4. The missile recited in claim 3 wherein the receiver/processor is adapted to: (a) compare the first set of error correction coefficients with the "in-flight" error coefficients and adjust the second set of error correction coefficients in accordance with such comparison; and, (b) if R.F. energy external to the missile is less than a predetermined threshold level, use the adjusted second set of error correction coefficients during the missile's flight to produce boresight error signals; or otherwise, use unadjusted the first set of error correction coefficients.

5. A method for calibrating the radar system, comprising the steps of:

loading software into a memory of the missile, such software including tactical software and statistically generated "average" error correction coefficients;

transmitting a radar test signal through an antenna of the missile to a receiver/processor in the missile to produce "through-the-antenna" personalized error correction coefficients;

re-formatting the software previously loaded into the memory to include the calculated "through-the-antenna" personalized error correction coefficients software; and loading the re-formatted software into the memory.

6. A method for calibrating the radar system comprising the steps of:

transmitting a radar test signal through a monopulse arithmetic unit internal to the missile to a receiver/processor in the missile to produce personalized error correction coefficients;

writing over previously stored personalized error correction coefficients with the produced internal/factory personalized error correction coefficients.

7. A method for up-grading tactical software in a missile, such missile having stored in a memory therein prior to up-grading previous tactical software stored in a protected, non-externally readable file thereof, and stored in a non-protected, externally readable file thereof personalized error correction coefficients, comprising the steps of:

reading external of the missile the personalized error correction coefficients stored in the memory;

re-formatting up-graded tactical software with the externally read personalized error correction coefficients; and storing the re-formatted software in the memory.

8. A method for calibrating a radar system adapted to generate control signals for a guided missile, such radar system having: a monopulse antenna adapted to receive radar signals; a monopulse arithmetic unit coupled to the monopulse antenna for producing a sum signal, an azimuth difference signal, and an elevation difference signal; a monopulse receiver/signal processor fed by the sum, azimuth and elevation signals for producing boresight error signals in accordance with such monopulse arithmetic unit produced signals and in accordance with error correction coefficients stored in a memory disposed within the missile, comprising the steps of:

loading software into the memory, such software including tactical software and statistically generated "average" error correction coefficients;

transmitting a radar test signal through the antenna to the receiver/processor;

reading external of the missile, signals produced by the receiver/processor in response to the transmitted test signal and the statistically generated "average" error coefficients stored in the memory;

calculating personalized error correction coefficients for the missile in response to the read signals;

re-formatting the software previously loaded into the memory to include the calculated personalized error correction coefficients software and the tactical software;

loading the re-formatted software into the memory by the loaded software writing over the initially loaded software.

9. A method for calibrating a radar system adapted to generate control signals for a guided missile, such radar system having: a monopulse antenna adapted to receive radar signals; a monopulse arithmetic unit coupled to the monopulse antenna for producing a sum signal, an elevation difference signal, and an azimuth difference signal; and a monopulse receiver/processor producing boresight error signals in accordance with such monopulse arithmetic unit produced signals and error correction coefficients stored in a memory disposed within the missile, comprising the steps of:

loading software into the memory, such software including tactical software and statistically generated default error correction coefficients;

transmitting a radar test signal through the antenna disposed;

reading external of the missile, signals produced by the receiver in response to the transmitted test signal and the statistically generated default error coefficients stored in the memory;

calculating "through-the-antenna" produced personalized error correction coefficients for the missile in response to the read signals;

generating a radar test signal internal to the missile and injecting such test signal into the monopulse arithmetic unit;

measuring signals produced by the receiver in response to the internal test signal;

calculating internally generated personalized error coefficients in response to the internal test signal;

reformatting the software previously loaded into the memory to include the calculated "through-the-antenna" and internally personalized error correction coefficients and the tactical software;

loading the reformatted software into the memory by writing over the initially loaded software.

10. A method for calibrating a radar system adapted to generate control signals for a guided missile, such radar system having: a monopulse antenna adapted to receive radar signals; a monopulse arithmetic unit coupled to the monopulse antenna for producing a sum signal, an azimuth difference signal, and an elevation difference signal; and a monopulse receiver/processor for producing a boresight error signal from the monopulse arithmetic unit produced signals error correction coefficients stored in a memory disposed within the missile, such memory storing tactical software in a protected, non-externally readable section of the memory and non-protected data in an externally readable section of the memory, the error coefficients being stored in the externally readable section of the memory, comprising the steps of:

initiating loading of updated software including updated tactical software into the memory to write over the tactical software previously stored in the memory;

externally reading from the memory the externally readable data from the memory;

storing the error coefficients read from the memory;

re-formatting the updated software with the stored error coefficients; and loading the re-formatted software into the memory, such loaded software writing over the software stored in the memory.

11. A method for operating a radar system adapted to generate control signals for a guided missile, such radar system having: a monopulse antenna adapted to receive radar signals from a target; a monopulse arithmetic unit coupled to the monopulse antenna for producing a sum signal, an elevation difference signal, and an azimuth difference signal from energy received by the antenna from the target; and a monopulse receiver/processor for producing boresight error signals in accordance with the monopulse arithmetic unit produced signals and error correction coefficients stored in a memory disposed within the missile, comprising the steps of:

performing a first test to determine personalized error coefficients using test signals injected internal to the monopulse arithmetic unit to the receiver/processor and storing such as a first set of personalized error coefficients and performing a second set to determine personalized error coefficients using test signal injected through the antenna to the receiver/processor and storing such as a second set of personalized error coefficients;

performing a test during the missile's flight to determine in-flight personalized error coefficients using the test signals internal to the missile injected into the monopulse arithmetic unit to the receiver/processor;

comparing the first set of error correction coefficients with the in-flight error coefficients and adjusting the second set error correction coefficients in accordance with such comparison; and, using the adjusted coefficients during the missile's flight.

12. A guided missile, comprising:

(a) a radar system adapted to generate control signals to guide such missile in response to target radar return signals, such radar system, comprising:

(i) a monopulse antenna adapted to receive radar signals from the target;

(ii) a monopulse arithmetic unit coupled to the monopulse antenna for producing a sum signal, an elevation difference signal, and an azimuth difference signal from energy received by the antenna from the target;

(iii) a monopulse receiver/processor for producing boresight error signals in accordance with the monopulse arithmetic unit produced signals and error correction coefficients stored in a memory disposed within the missile, such memory having stored therein:

first personalized error coefficients generated in response to test signals injected internal to the monopulse arithmetic unit to the receiver/processor and a second set to determine personalized error coefficients using test signal injected external to the missile through the antenna to the receiver/processor;

(b) test equipment for performing a test during the missile's flight to determine in-flight personalized error coefficients using the test signals internal to the missile injected into the monopulse arithmetic unit to the receiver/processor; and (c) wherein the receiver/processor compares the first set of error correction coefficients with the in-flight error coefficients and adjusting the second set error correction coefficients in accordance with such comparison; and uses the adjusted coefficients during the missile's flight to produce the boresight error signals.

* * * * *